(12) United States Patent
Shapiro et al.

(10) Patent No.: US 6,255,551 B1
(45) Date of Patent: Jul. 3, 2001

(54) METHOD AND SYSTEM FOR TREATING CONTAMINATED MEDIA

(75) Inventors: Andrew Philip Shapiro; Joseph James Salvo, both of Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/325,836

(22) Filed: Jun. 4, 1999

(51) Int. Cl.$^7$ ............................................. A62D 3/00
(52) U.S. Cl. ...................... 588/204; 205/743; 205/770; 205/766; 204/515; 204/519; 204/555; 204/556
(58) Field of Search ............................ 205/743, 766, 205/770; 204/555, 515, 556, 519, 280; 588/204

(56) References Cited

U.S. PATENT DOCUMENTS

| | | | |
|---|---|---|---|
| 5,074,986 | 12/1991 | Probstein et al. | 204/130 |
| 5,120,414 | 6/1992 | Carson et al. | 204/180.1 |
| 5,362,394 | 11/1994 | Blowes et al. | 210/617 |
| 5,391,305 | 2/1995 | Haitko | 210/757 |
| 5,398,756 | 3/1995 | Brodsky et al. | 166/248 |
| 5,447,639 | 9/1995 | Sivavec | 210/747 |
| 5,476,992 | 12/1995 | Ho et al. | 588/204 |
| 5,510,033 | 4/1996 | Ensley et al. | 210/611 |
| 5,584,980 | * 12/1996 | Griffith et al. | 204/516 |
| 5,614,077 | 3/1997 | Wittle et al. | 205/704 |
| 5,736,637 | 4/1998 | Evans et al. | 73/152.31 |
| 5,750,036 | 5/1998 | Sivavec | 210/747 |
| 5,861,090 | 1/1999 | Clarke et al. | 205/688 |
| 5,882,491 | * 3/1999 | Wardle | 204/290 R |

* cited by examiner

Primary Examiner—Kathryn Gorgos
Assistant Examiner—Thomas H Parsons
(74) Attorney, Agent, or Firm—Bernadette M. Bennett; Noreen C. Johnson

(57) ABSTRACT

A process treats contaminated media and comprises detecting a non-uniform contaminated media property selected from electrical conductivity or electroosmotic permeability; and selectively applying an electric field to the contaminated media to effect the process in a selected area of the contaminated media.

19 Claims, 4 Drawing Sheets

METHOD AND SYSTEM FOR TREATING CONTAMINATED MEDIA

BACKGROUND OF THE INVENTION

1. Field of the Invention

The invention relates to a method and system for treating contaminated media. In particular, the invention relates to a method and system employing an electrode structure that is capable of controlling a treatment method in contaminated media.

2. Description of the Related Art

Halogenated hydrocarbons, such as chlorinated hydrocarbons, are also known as chlorinated solvents (hereinafter collectively referred to as "chlorinated solvents"). Halogenated hydrocarbons have low flammability and are fairly stable, both chemically and biologically. They are commonly used in industry as chemical carriers and solvents, paint removers, and cleaners. The cleaning applications typically include metal degreasing, circuit board cleaning, metal parts cleaning, and dry cleaning. Chlorinated solvents are also used as intermediates in chemical manufacturing and as carrier solvents for pesticides and herbicides.

Chlorinated solvents are stable compounds, are relatively toxic at low levels, and many chlorinated solvents have been classified as suspected or confirmed carcinogens. Chlorinated solvents are prevalent contaminants in groundwater and soil because of their widespread use and long-term stability. Groundwaters and soils have become contaminated by chlorinated solvents from various sources. These sources include, but are not limited to, disposal facilities, chemical spills, and leaking underground storage tanks. Chlorinated solvents also may be released to the environment through the use, loss, or disposal of a neat liquid, and alternatively through the use or disposal of wash and rinse waters containing residual solvents.

Movement and dispersion of chlorinated solvents in the subsurface soils and groundwaters vary depending on whether the solvents are released as a neat liquid or in a dissolved form. If released in a dissolved form, chlorinated solvent migration is governed largely by hydro-geological conditions and processes. The presence of solubilizing agents, such as soaps from wash waters, counteracts natural soil sorption-retardation mechanisms for chlorinated solvents, and enhances migration of the chlorinated solvents.

If chlorinated solvent is released as a neat liquid, the chlorinated solvent migrates through soil under the force of gravity. A portion of the chlorinated solvent is typically retained in soil pores. If sufficient chlorinated solvent is present in the soil, the soil pores become saturated. Additional chlorinated solvent continues to migrate in the soil until it encounters a physical barrier or a water table. If the chlorinated solvent encounters a water table, the chlorinated solvent disperses until it encounters, accumulates, and overcomes the water table's capillary forces. At this point, the chlorinated solvent, which has a greater density than water, penetrates the water table's surface. The chlorinated solvent migrates under the force of gravity until its amount has been diminished through sorption, or until the chlorinated solvent encounters an aquitard.

In recent years, soil and groundwater contamination by chlorinated solvents has become an environmental problem. Chlorinated ethylenes, such as trichloroethylene (TCE), tetrachloroethylene (commonly known as perchloroethylene (PCE)), and chlorinated ethanes, such as 1,1,1-trichloroethane (TCA), which have been used as degreasing agents in a variety of industrial applications, pose environmental problems. Even though chlorinated degreasing agent use was curtailed in 1976, improper storage and uncontrolled disposal practices have resulted in contamination. Due to the high water solubility of chlorinated solvents, for example about 1100 mg/L TCE at 25° C., chlorinated solvents are highly mobile in soils and aquifers, and should be removed before dispersing too far. Therefore, a treatment to remove chlorinated solvents from contaminated soil and groundwater is needed.

A pump-and-treat method is a proposed treatment method removing contaminants from contaminated groundwater. The treatment usually involves withdrawing contaminated water from a well, volatilizing the contaminants in an air stripping tower, and adsorbing vapor-phase contaminants into granular-activated-carbon (GAC). There are limitations to this pump-and-treat method. The method is relatively inefficient, and some sites can require treatment for extended periods of time.

Chlorinated solvents can be degraded into less harmful materials by a method commonly referred to as "reductive dechlorination," in which chlorine is replaced by hydrogen. The reductive dechlorination uses metallic, solid reaction elements, such as iron and zinc, to degrade chlorinated solvents and other organic compounds. For example, Gillham, U.S. Pat. No. 5,266,213, discloses feeding contaminated groundwater through a trench containing iron to degrade contaminants. The Gillham process is conducted under strict exclusion of oxygen and occurs over a long time period. The Gillham process often requires large amounts of iron for complete reaction. Furthermore, it is difficult to introduce large volumes of solid reaction material, such as iron, using the Gillham process at effective depths for in situ remediation.

Another process proposed for removing contaminants from contaminated media is soil vapor extraction. In this process, contaminated media, such as contaminated soil is removed from the its location and treated to remove contaminants and vapor. The soil vapor extraction process is labor extensive and often is inefficient as recalcitrant fractions of the contaminants remain in the soil. Further, the soil vapor extraction process, as well as the above-described pump-and-treat process, is very difficult to use in some soils. For example, neither the soil vapor extraction process nor the pump-and-treat process, are particularly useful to treat contaminants in tight, clayey soils.

Several electrokinetic-based contaminated media treatment processes are known to have been used in attempts to treat contaminated media, such as treatment of chlorinated solvents, including hydrocarbons. An electrokinetic-based process typically moves charged particles through a continuous medium. A electrokinetic-based process also refers to a process in which charged particles are moved through a continuous medium over a charged surface. One electrokinetic-based process is the "Lasagna" process, which refers to a process that incorporates a plurality of treatment regions to destroy or adsorb contaminants between emplaced electrodes. The "Lasagna" process is disclosed in U.S. Pat. Nos. 5,398,756 to Brodsky et al. and 5,476,992 to Ho et al. The disclosures of these patents are incorporated herein by reference.

A "Lasagna" process typically includes the steps of (a) forming at least one liquid permeable region within a contaminated media, such as a contaminated soil region, (b) introducing material for treatment of contaminants in the contaminated media into a region of the contaminated media, such as a liquid permeable region, where the material typically forms at least one treating region within the contaminated media; and (c) applying and transmitting a direct electric current (DC electrical field) through the contaminated media between oppositely charged electrodes, wherein a first electrode is disposed at a first end of the contaminated media and a second electrode is disposed at the opposite end of the contaminated media. Thus, an electroosmotic flow is established from the second to the first electrode, and an in situ electrokinetic remediation of contaminated media, such as soil, is able to be achieved.

In situ electrokinetic remediation possesses several advantages with respect to other commonly applied remediation technologies. Contaminants can be removed from low permeability soils using in situ electrokinetic remediation. Also, fluid and ionic flow direction can be controlled using in situ electrokinetic remediation. Further, control of a flow direction is enhanced compared to common pump and treat systems because flows in in situ electrokinetic remediation follow electric field lines established by the application of the DC electrical field, which begin and end at electrodes. In contrast, flow in pump and treat systems is typically controlled and influenced by a pressure field in the contaminated media that can be adversely influenced by regions of high soil permeability and fissures through the contaminated media.

While electrokinetic remediation treatments possess desirable qualities with respect to pump and treat processes, their operation may be further improved by enhancing its flow direction control. For example, buried metal objects or regions of high-metallic content in the contaminated media may adversely distort the applied DC electrical field. This distortion may prevent uniform distribution of current in the soil. Also, electrokinetic remediation inherently heats the soil, and thus may create non-uniform contaminated media properties, including but not limited to, electrical conductivity and electroosmotic permeability. Non-uniform contaminated media properties may adversely influence the efficiency of the electrokinetic remediation process.

Therefore, elimination of the adverse influences of a remediation treatment process is needed.

SUMMARY OF THE INVENTION

The invention sets forth a process that treats contaminated media. The process comprises detecting a non-uniform contaminated media property selected from electrical conductivity or electroosmotic permeability; and selectively applying an electric field to the contaminated media to effect the treatment process in a selected area of the contaminated media.

Another method for treating a contaminated media that comprises a contaminated aqueous composition, which is within the scope of the invention, comprises emplacing electrodes proximate contaminated media that comprises an iron(III)-containing zone peripherally disposed to the contaminated aqueous composition; injecting a solution containing a remediating sulfide salt into contaminated media; and selectively applying an electric current between electrodes imposed across an iron(III)-containing zone that is peripheral to the contaminated aqueous composition. These steps cause the remediating sulfide salt to selectively migrate into the iron(III)-containing zone and reacts with iron(III) to produce a ferrous sulfide barrier zone that is generally peripheral to the contaminated aqueous composition.

Another embodiment of the invention provides an electrode that is emplaced into a vicinity of a contaminated media soil region for treatment of the contaminated media. The electrode comprises a segmented electrode with a plurality of conducting segments. Each pair of the plurality of conductive segments is separated by an insulating segment. The segmented electrode further comprises electrical contacts between each conductive segment and an electric source that is capable of separately applying an electric charge to each conductive segment.

A system for treating a contaminated media that comprises a contaminated aqueous composition is also set forth by the invention. The system comprises at least one detector that detects non-uniform electrical conductivity or electroosmotic permeability in the contaminated media; at least one controller that is responsive to the detection of a non-uniform electrical conductivity or electroosmotic permeability of the contaminated media; and at least one segmented electrode connected to the controller. The at least one segmented electrode is emplaced proximate the contaminated media, the segmented electrode is able to selectively apply an electric field to the contaminated media in response to the controller.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

The treatment method, as embodied by the invention, comprises disposing or emplacing electrodes proximate contaminated media. The term "proximate" means in, at, near, or around the contaminated media so that an electrical field created between the electrodes is able to effect fields within the contaminated media, and "emplace" means that the electrodes are disposed in or on the contaminated media region, around the contaminated media region, and combinations thereof. A "non-uniformity" in the contaminated media is located by a conventional operation, which is within the level of skill in the art. The term "non-uniformity" means irregularities in the media, including, but not limited to, regions of irregular temperature, high-metallic or other material content, irregular permeability in the media, varying electronic field configurations in the media, and combinations thereof.

The method, as embodied by the invention, provides at least one electrode as a segmented electrode 13. Each segment of the segmented electrode 13 is separately connected to a current source by a separate individual lead. Therefore, individual segments of the segmented electrode 13 can be separately controlled to provide a different current through non-uniform portions of the contaminated media. Contaminated media non-uniform portions can be determined and monitored by sampling. Thus, the treatment process can be controlled to avoid non-uniform portions of the contaminated media, such as buried objects and differences in soil permeability and temperature.

The invention comprises a system, its components, and method for controllably treating contaminated media, such as, but not limited to, at least one of contaminated soil and contaminated groundwater. The following description will refer to "contaminated media," and includes contaminated soil, contaminated groundwater, and combinations, mixtures, and suspensions thereof. Further, the description of the invention may refer to contaminants as chlorinated solvents. The scope of the invention includes contaminants comprising chlorinated solvents, and also including but not limited to, chlorinated hydrocarbons; halogenated hydrocarbons; chlorinated ethylenes, such as trichloroethylene (TCE), tetrachloroethylene, commonly known as perchloroethylene (PCE); chlorinated ethanes, such as 1,1,1-trichloroethane (TCA); dichloroethane, trichloroethane, carbon tetrachloride, chloroform and dichloromethane are illustrative examples of contaminants. Other halogenated hydrocarbon compounds that may be treated, by the treatment method as embodied by the invention, include chloroethane, methyl chloride, brominated methanes, brominated ethanes, brominated ethenes, fluorinated methanes, fluorinated ethanes, fluorinated ethenes, fluorochloromethanes, fluorochloroethanes and fluorochloroethenes. combinations and mixtures thereof.

Figure 1:
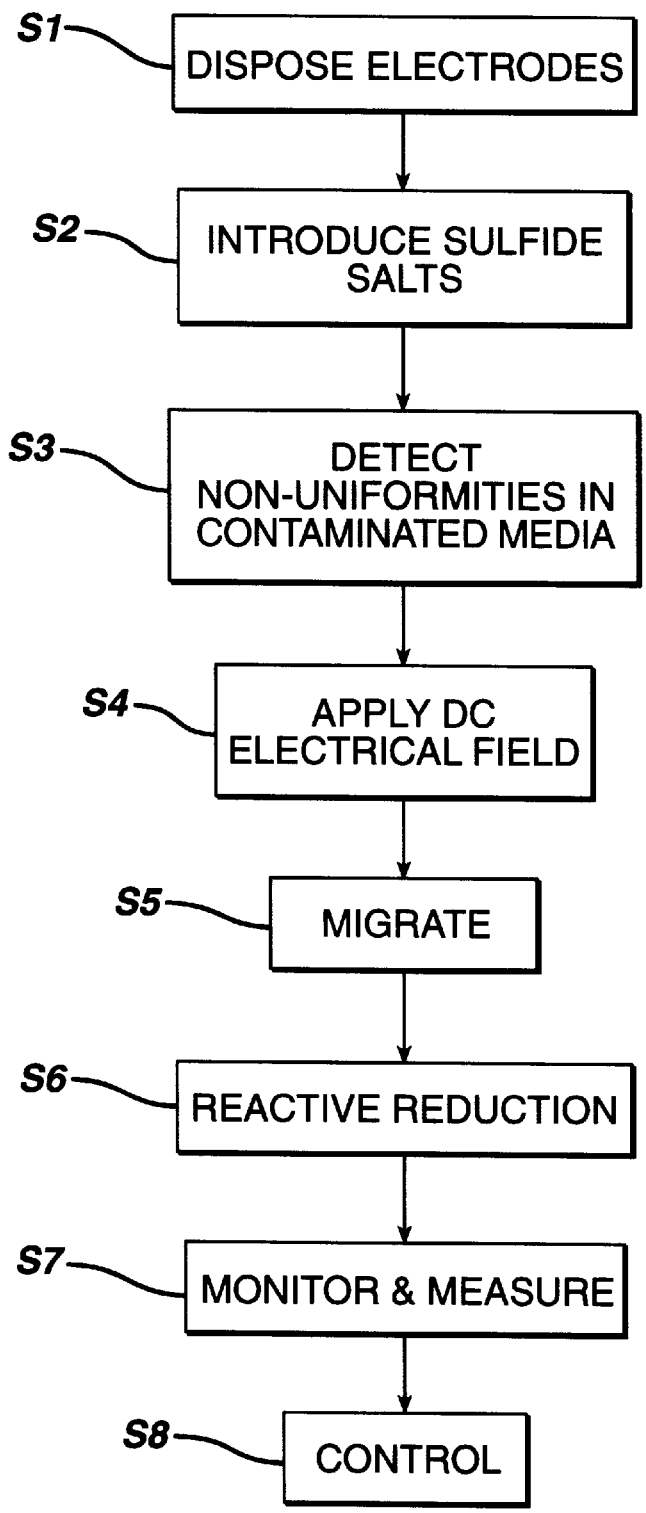
FIG. 1 is a is a flowchart of a treatment method according to the invention.

The treatment method, as embodied by the invention, comprises a series of steps, as illustrated in the flowchart of FIG. 1. The treatment method comprises disposing electrodes proximate the contaminated media in step S1. In step S2, sulfide salts are introduced into contaminated media. The sulfide salts are introduced to treat contaminants, for example by reductively reacting with contaminants, in the contaminated media.

Next, in step S3, non-uniform contaminated media properties in the contaminated media are detected. A controlled direct current electrical field (DC electrical field) is then applied to the contaminated media in step S4 to form ions from the sulfide salts. The application of the DC electrical field also causes migration of the introduced sulfide salts and their ions, in step S5. The formed ions comprise at least one of sulfide ions and bisulfide ions (hereinafter collectively referred to as remediating-sulfide ions).

The remediating-sulfide ions react with iron(III) found in the contaminated media in step S6. The reaction of the sulfide ion and iron(III) also precipitates ferrous sulfides in the contaminated media. The precipitated-ferrous sulfides form a ferrous-sulfide zone, which can be used for further contaminant treatment steps. The process is monitored for contaminant content in step S7. The monitored contaminant content amount is used to control application of the electrical field control in step S8. Therefore, the potential difference from the DC electrical filed is controlled in response to the contaminant content monitoring.

The sulfide salts comprise sulfide salts that can be provided in aqueous solutions. The sulfide salts typically comprise at least one of sodium sulfide and sodium bisulfide. The sulfide salts, as embodied by the invention, comprise a sulfide selected from at least one of sodium bisulfide, sodium sulfide nonahydrate ($Na_2S\ 9H_2O$), sodium sulfide ($Na_2S$), sodium hydrogen sulfide, hydrogen sulfide, and ferrous sulfide, compounds, mixtures, and combinations thereof.

The sulfide salts are introduced into the contaminated media in step S3 at the electrodes, which may define an "injection well." The injection well functions as an electrode of the electrode set that applies the DC electrical field, either as an anode or cathode. The injection well is disposed and positioned vertically opposite at least one vertically oriented oppositely-charged electrode. Alternatively, the injection well is horizontally disposed and positioned over or under at least one electrode. Combinations of electrodes, which can be disposed at various orientations proximate the contaminated media, are within the scope of the invention.

The application of the DC electrical field to the contaminated media in step S4 is controlled in response to the monitored contaminant content in step S7 (as described hereinafter). The application of the DC electrical field ionizes the sulfide salts. The ionization forms at least one ionized reducing (remediating) agent and remediating ions (hereinafter collectively "remediating-sulfide ions") in the contaminated media. The remediating-sulfide ions are formed by reactions of contaminants in the contaminated media with ionized sulfide salts, for example under the influence of the DC electrical field.

The DC electrical field migrates the remediating-sulfide ions in step S5 to contaminated media regions in the contaminated media. This migration is an electrokinetic process called "electromigration." Electromigration means the movement of ionic matter in a matrix toward an electrode of opposite charge when a constant, low DC electrical current is applied to electrodes. Electroosmosis and electromigration are known processes to those of ordinary skill in the art. In applications involving relatively high permeability soils, the migration also supplies additional reducing agents to treat the contaminated media, for example chlorinated solvents in the contaminated media. These additional reducing agents include, but are not limited to, organic acids, thiosulfate, metabisulfite, hypophosphite and ammonium ions.

Electrokinetic processes include electroosmosis and electromigration. Electroosmosis is the movement of water in the soil matrix from an anode to a cathode and electromigration is the movement of ionic contaminants in the soil matrix in a direction toward the electrode of opposite charge when a constant, low DC electric current is applied to electrodes located in a contaminated soil region. Electroosmosis and electromigration can be accomplished by any known method.

These contaminated media regions include regions that are typically un-treatable by conventional contaminant treatment methods. For example, conventional hydraulic pumping treatment methods may not provide sufficient movement of treatment materials to hard to reach contaminated media regions, such as areas of low permeability. The migration of the remediating-sulfide ions, as embodied by the invention, causes the remediating-sulfide ions to reach and treat contaminated media regions of low permeability.

The remediating-sulfide ions migrate under the control of the DC electrical field and contact materials in the contaminated media. These materials in the contaminated media include, but are not limited to, chlorinated solvents, water, organic material, and inorganic materials found in the soil of contaminated media. For example, the contaminated media may include iron(III) minerals and iron(III)-containing materials in an iron-containing zone. The remediating-sulfide ions contact the iron-containing zone, react therewith, and reduce iron(III)-containing minerals to iron (II) minerals and iron(II)-remediating ions in step S6. Also, the remediating-sulfide ions combine with iron(II) to form bulk-reductant ferrous sulfide. The bulk-reductant ferrous sulfide aids in the treatment of contaminated media, for example aids in the reductive dechlorination of chlorinated solvents, as embodied by the invention.

The reactive reduction degradation of chlorinated solvents may occur by a reductive dechlorination mechanism in which carbon-chlorine bond reduction is coupled to the oxidized Fe(II) to Fe(III) at the clay-bound ferrous-water interface. Exemplary iron(III)-containing minerals include magnetite, goethite, hematite, maghemite, ferihydrite and lepidocricite. Natural hydraulic gradients then transport the organic contaminants to the modified clay zones where degradation of the contaminants continues.

Alternatively, the remediating-sulfide ions migrate into iron(III)-containing soil and react therewith to form a ferrous-sulfide zone. The ferrous-sulfide zone can act as a barrier in the contaminated media to confine migrating contaminated aqueous compositions. The ferrous-sulfide zone acts as a barrier in the contaminated media to define a treatment zone. When defining a treatment zone, a further DC electrical field can be applied to the defined-treatment zone and cause contaminated media, for example contaminated water, to move by electroosmosis. If electroosmosis in the contaminated media is limited, for example due to high impermeability in the contaminated media, the ferrous-sulfide region serves as a permeable barrier (perimeter) for the treatment's control. Electroosmosis is the movement of water in a soil matrix resulting from an electric field.

Contaminated material content of the contaminated media is monitored and measured in step S7 to determine progress of the treatment process. This step is conducted by conventional monitoring and determining processes. The conventional monitoring and determining processes include, but are not limited to, steps of taking an initial sampling of the contaminated media region and determining a baseline contaminant level. The monitoring can include periodic monitoring of the contaminant level during the treatment method to determine its progress.

The treatment method is controlled in step S8 by comparing the monitored-contaminant level to the baseline contaminant content. This comparison determines extent of operation of the method, and is used to control the potential difference applied by the DC electrical field. The control of the potential difference comprises at least one of increasing, redirecting, and terminating the application of the DC electrical field, and thus its potential difference.

Figure 2:
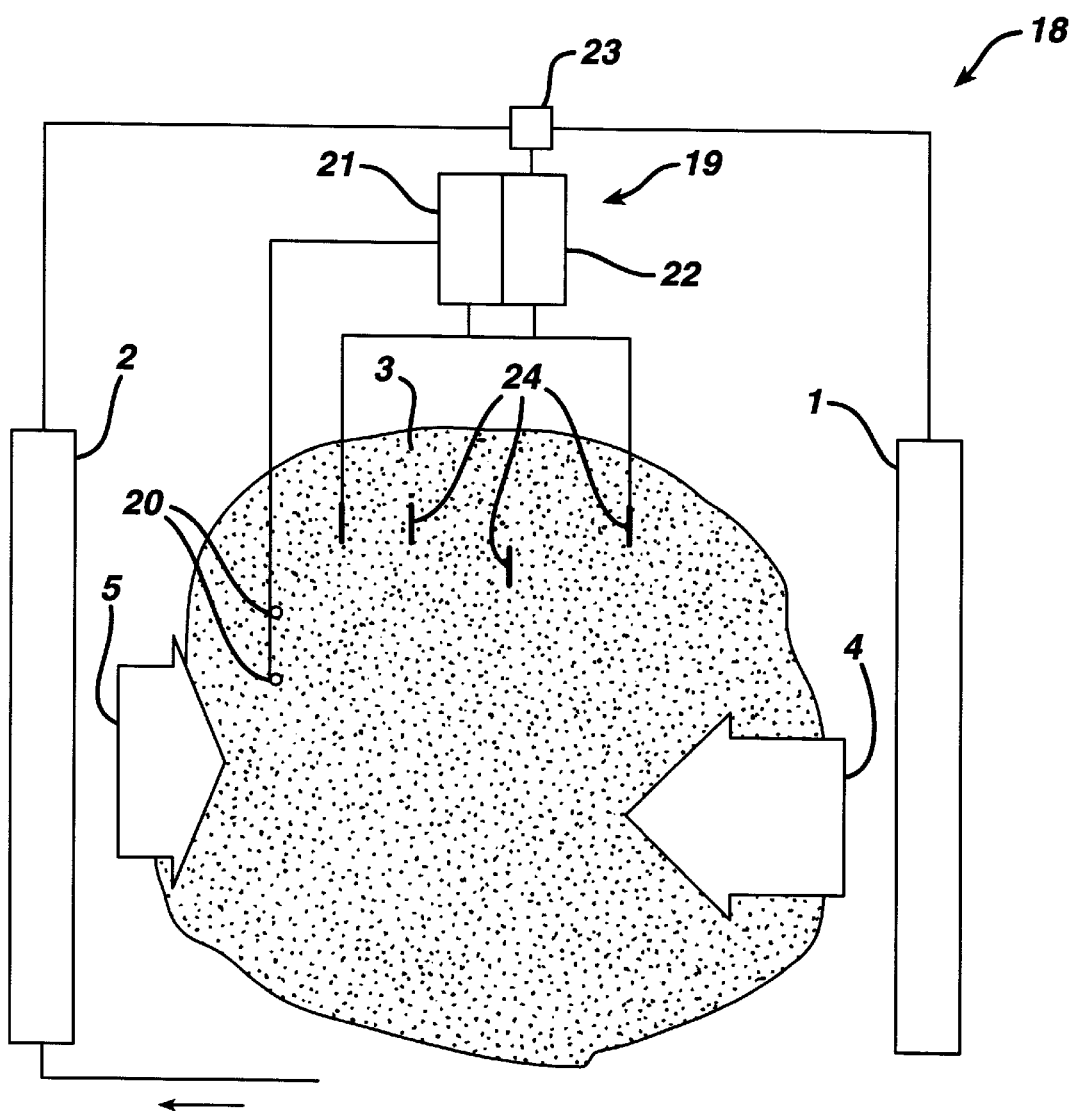
FIG. 2 is a schematic representation of a method of migrating a remediating salt into at least a portion of a zone.

FIG. 2 is a schematic illustration of a system that employs the treatment method, as embodied by the invention. In FIG. 2, an electrode set comprises a cathode 1 and anode 2 (also known in the art as "cathode wells" and "anode wells, respectively), each of which are disposed proximate the contaminated media. Cathode 1 can comprise a single cathode, and alternatively comprises a plurality of cathodes. Similarly, anode 2 can comprise a single anode, and alternatively, comprises a plurality of anodes.

Contaminated media region 3 typically comprises an iron(III)-containing aquifer, clay, clay-bearing soil, or sediment. The location of the iron(III)-containing aquifer, clay, clay bearing soil or sediment in the contaminated media is initially determined by sampling or other methods known in the art. The initial location determination will also permit determination of a contaminant content amount (baseline) for use in the controlling step of the invention.

The sulfide salt that is injected into the contaminated media region 3 can be provided in an aqueous solution of sulfide salt, such as sodium sulfide or sodium bisulfide. An electric current is applied between the cathode 1 and anode 2 to form a DC electrical field (step S2). The DC electrical field forms sulfide in the direction of arrow 4 ($S^{-2}$) ions in the contaminated media region 3. The DC electrical field typically comprises a voltage in a range between about 0.1 volts/cm and about 10 volts/cm.

The system as illustrated in FIG. 2 is merely exemplary of systems within the scope of the invention. For example, the treatment method, as embodied by the invention, is applicable to control processes wherein a dissolved, ionic-remediating component can be transported for treatment of a contaminated media. The treatment process, as embodied by the invention, uses the so-called "Lasagna" process, which incorporates a plurality of treatment zones to destroy or adsorb contaminants between emplaced electrodes. Examples of Lasagna process systems are disclosed by Brodsky et al., U.S. Pat. No. 5,398,756 and Ho et al., U.S. Pat. No. 5,476,992. A "Lasagna" process typically comprises forming at least one liquid permeable region within a contaminated soil region, introducing material for treating contaminants in the contaminated soil region into the liquid permeable region to form at least one treating zone within the contaminated soil region, and transmitting direct electric current through the contaminated soil region between oppositely charged electrodes. A first electrode is located at a first end of the contaminated soil region and the second electrode is located at the opposite end of the contaminated soil region. Thus, an electroosmotic flow of material in the contaminated soil region in the direction of arrow 5, from the second to the first electrode, is established.

Figure 3:
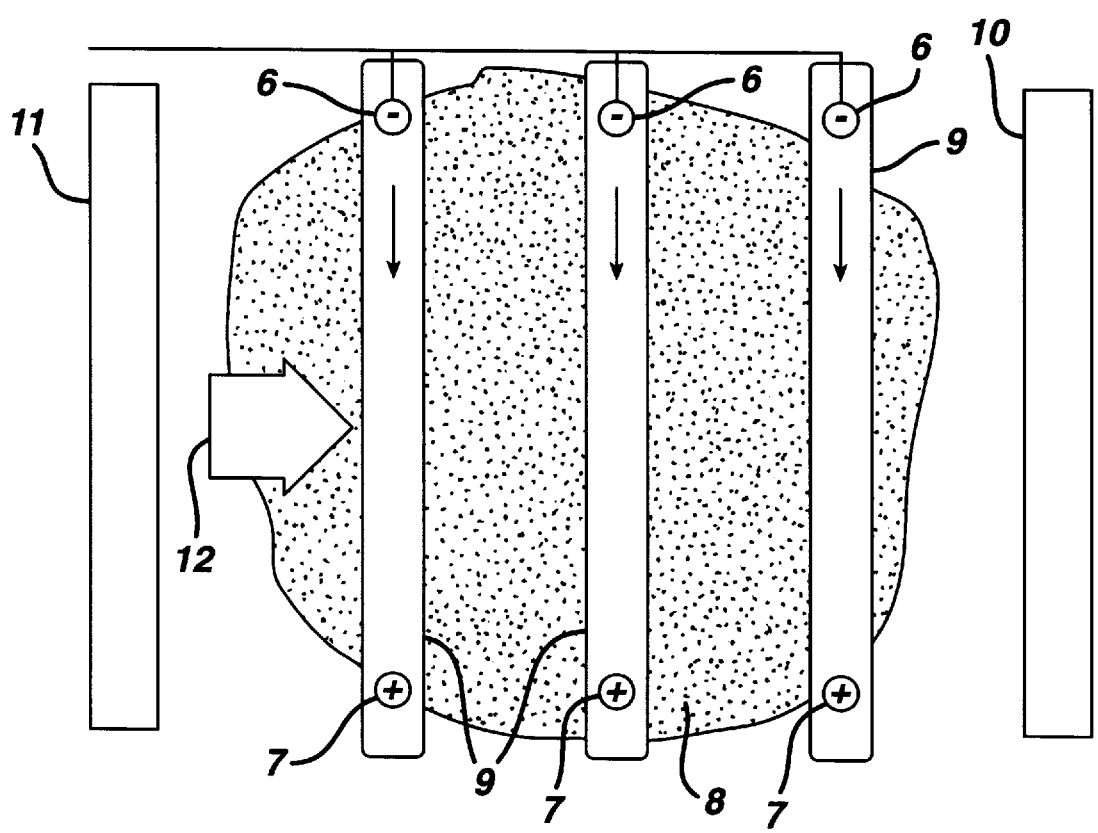
FIG. 3 is a schematic representation of a method of forming treatment regions.

A portion of the "Lasagna" process cost involves the installation and material costs of the treatment zones. The treatment process, as embodied by the invention, forms treatment zones that reduce costs associated with the installation and materials in the when the "Lasagna" process. FIG. 3 illustrates an exemplary "Lasagna" system that relies upon multiple regions and zones that are common in a Lasagna process. The system comprises an electrode set, which includes pairs of cathodes 6 and anodes 7. The electrode set is emplaced in an opposing relationship in contaminated media, for example across a permeable reaction region 8. A remediating salt, as embodied by the invention, is injected into the permeable reaction region 8, for example proximate each cathode 6. The permeable reaction region 8 can comprise aquifer materials, soils, sediments, clay minerals containing iron (III) or with iron (III)-containing minerals, which include, but are not limited to, magnetite, goethite, hematite, maghemite, ferihydrite, and lepidocricite.

The injected remediating salt can comprise a sulfide, as discussed above. A DC electrical field is applied across the electrode set, and causes negative ions to migrate from the cathode and positive ions to migrate from the anode into the permeable reaction region 8. The positive and negative ions form barrier zones 9. The electrode set also comprises electrodes 10 and 11 that apply a DC electrical field across the permeable reaction region 8. The electrodes 10 and 11 are typically oriented to be substantially perpendicular to the barrier zones 9. Thus, the electrodes 10 and 11 cause contaminated water in the contaminated media to migrate in the direction of arrow 12 through the barrier zones 9 for treatment in accordance with the "Lasagna" process.

The electrode set includes at least one anode and cathode, either or both of which comprise an iron-containing material. For example, an anode is formed as an iron anode. As used herein, the term "cathode" and the term "anode" are used in the singular, however the terms can mean a single electrode or a plurality of electrodes. The electrodes are disposed at approximately the same plane or level, for example, the same horizontal, vertical, or diagonal level. The levels depend on whether the contaminated-media treatment zone is disposed vertically, horizontally, or diagonally with respect to a contaminated media surface. Electrical connections, electrode sizes, and electrode materials for the electrodes include varying specifications depending on each treatment. For example, the electrodes may comprise carbon, in addition to iron, since carbon is a corrosion resistant material, in which carbon aids in pH buffering of the treatment method.

The electrodes may also comprise at least one of porous and perforated structures, each of which permits ingress and egress of liquid, for example groundwater. Alteratively, the electrodes are located within a perforated container, which is disposed in the contaminated media. A further alternative comprises electrodes that are disposed behind a liquid permeable barrier in the contaminated media.

Figure 4:
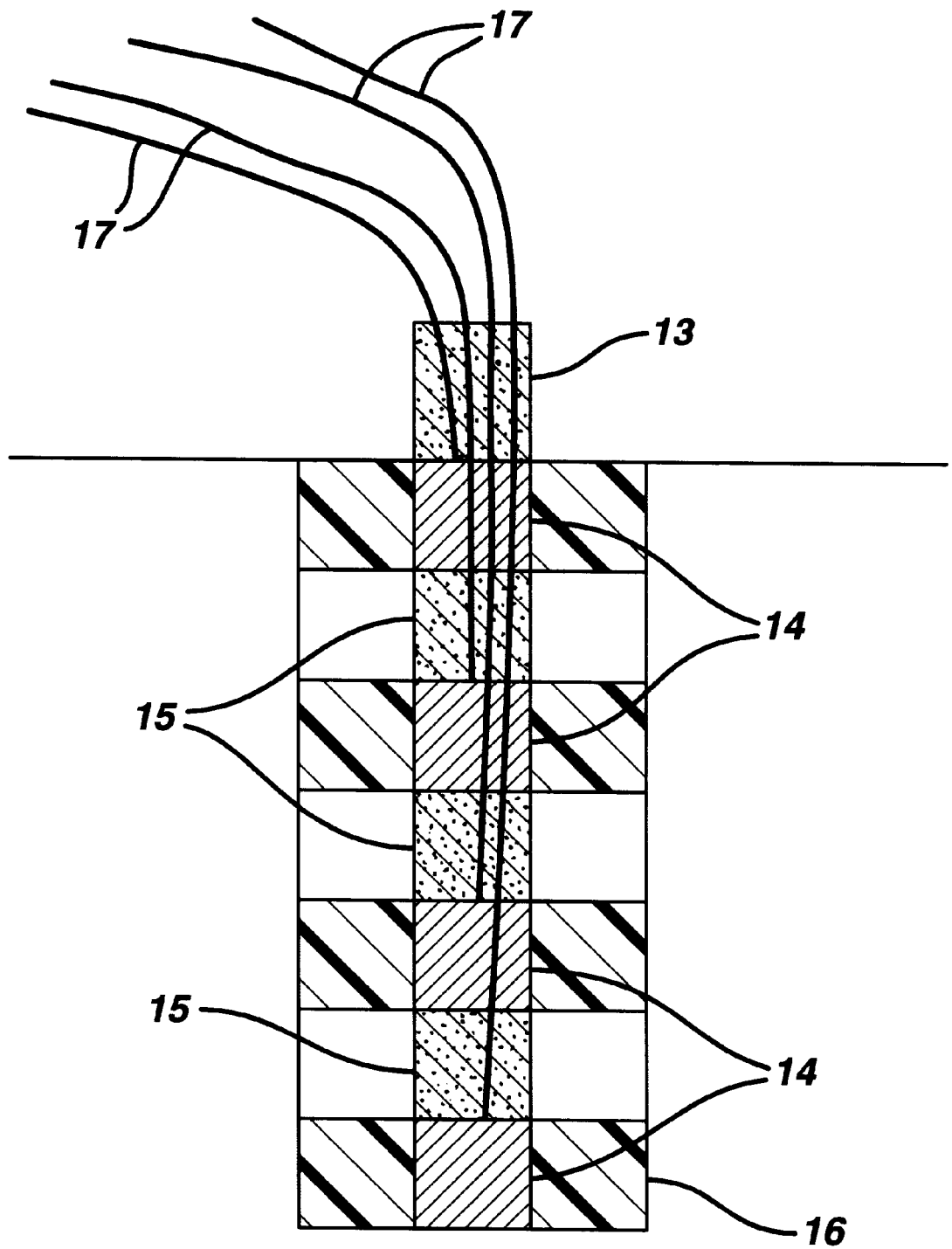
FIG. 4 is a schematic representation of a segmented electrode, as embodied by the invention.

FIG. 4 illustrates a schematic, part-sectional segmented electrode 13, as embodied by the invention. Each electrical connection is to a single segment of the segmented electrode 13 so different currents can be applied to different segments of the segmented electrode 13. The sizes of the segmented electrode 13 and their materials can also vary depending on the intended use and treatment particulars. The segmented electrode 13 comprise carbon materials, for example graphite, as carbon is a known corrosion resistant material. The carbon in the electrodes aid in pH buffering of the electrokinetic process.

The segmented electrode 13 can be porous or perforated to permit ingress and egress of liquid. The segmented electrode 13 can alternatively be located within a perforated container or directly behind a liquid permeable region or zone. The electrodes can also function as treating zones such as an adsorption zone wherein carbon or graphite particles serve as an adsorbent.

The segmented electrode 13 that is illustrated in FIG. 4 comprises a plurality of conducting segments 14. The conducting segments 14 are vertically stacked with insulating sections 15 positioned therebetween. The thickness of the conducting segments 14 is in a range from about 0.1 meters to about 0.5 meters, for example from about 0.3 meters to about 1.0 meter. The conducting segments 14 can comprise a thin rod with a diameter in a range from about 1.0 cm to about 50.0 cm, for example about 2.0 cm to about 10.0 cm. The segmented electrode 13 can also comprise an electrode zone 16, which is a zone that is generally concentric with the conducting segments 14 and insulating sections 15.

The electrode is connected by lead wires 17 to electrical equipment that applies the DC electrical field. The lead wires are also connected to a control system 18 for monitoring and controlling the treatment, as discussed hereinafter. The wire leads 17 are individually connected to individual conducting segments 14 of the segmented electrodes 13. The wire leads 17 thus are able to provide to a different current to each conducting segment 14. The wire leads 17 are connected to a power source (not illustrated) so that a different current can be applied to each wire lead 17.

A control system 18, as embodied by the invention, is used to treat contaminated media. As illustrated in FIG. 2 the system 18 comprises a controller 19, which is connected to at least one electric conductivity detector 20. An electric conductivity detector 20 comprises stainless steel rods or carbon rods emplaced in the contaminated media. Each electric conductivity detector 20 is disposed in the contaminated media and detects contaminant amounts. The electric conductivity detector 20 also monitors progress of the contaminant treatment method.

The controller 19 comprises an impedance voltage measuring device 21 and processor (also known as a "control unit") 22. The control unit 22 comprises any appropriate high-powered solid-state switching device. The control unit 22 is represented as a computer, which is merely exemplary of an appropriate high-powered control within the scope of the invention. For example but not limiting of the invention, the control unit 22 comprises at least one of a silicon controlled rectifier (SCR), a thyristor, MOS-controlled thyristor (MCT) and an insulated gate bipolar transistor. In the illustrated embodiment, the control unit 22 is implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the control unit 22 can also be implemented using a variety of separate dedicated or programmable integrated or other electronic circuits or devices, such as hardwired electronic or logic circuits including discrete element circuits or programmable logic devices, such as PLDs, PALs, PLAs or the like. The control unit 22 can also be implemented using a suitably programmed general-purpose computer, such as a microprocessor or microcontrol, or other processor device, such as a CPU or MPU, either alone or in conjunction with one or more peripheral data and signal processing devices. In general, any device or similar devices on which a finite state machine capable of implementing the flow charts, as illustrated in the application, can be used as the control unit 22.

The operation of the control system 18 will now be discussed. After emplacing the electrodes and introducing the sulfide salt into the contaminated media, non-uniform contaminated media properties of the contaminated media are detected by electric conductivity detectors 20. The electric conductivity detectors 20 generate signals that are sent to the impedance measuring device 21. The impedance measuring device 21 transforms the signals into data that is entered into the control unit 22.

The control unit 22 can be pre-programmed with a model, such as software, which permits determination of the extent of the contaminated media treatment. The control unit 22 then, by comparing the last read data and with instantaneous data, can adjust the DC electrical field, as needed, to control the treatment method, as embodied by the invention. For example, the control unit 22 can control voltage source 23 that supplies electrical energy to entire segmented electrodes 13 or portions of the segmented electrode 13. Therefore, the DC electrical field in the contaminated media and the zone 8 can be adjusted. The adjusted DC electrical field influences the a treatment process, as embodied by the invention.

The DC electrical field can be applied by two or more electrodes, and as discussed above at least one of the two or more electrodes comprise a segmented electrode 13. At least one of the electrodes that are emplaced proximate the contaminated media can comprise a segmented electrode 13, as embodied by the invention. Alternatively, each of the electrodes that are emplaced proximate the contaminated media can comprise segmented electrodes 13, as embodied by the invention. The locations of the electrodes, including the at least one segmented electrode 13, may vary, as long as a DC electrical field is established. For example, a cathode 1 and anode 2 can be placed on opposing sides of the contaminated media. Alteratively, a cathode 1 can be placed in a center of a zone 8 of the contaminated media and a plurality of anodes 2 can be disposed around the perimeter of the region, for example in a circular orientation or spherical orientation (three dimensional).

Another alternative comprises a plurality of segmented electrodes 13 that are arranged within the contaminated media, for example in a random arrangement and alternatively in a uniform grid arrangement. When a battery or plurality of segmented electrodes 13, as embodied by the invention, are used, electrodes of the same polarity can be placed next to one another. The spacing between these similar polarity electrodes is in a range from in contact with each other to spaced to about 3.0 meters (m). Segmented electrodes 13 of the same polarity are spaced from about 0.3 to about 1.0 meter apart. The distance between electrodes of different polarity can be from about 0.5 m to about 100 m, such as from about 1.0 m to about 10 m apart. Spacing of the segmented electrodes 13 will depend upon the desired strength of the DC electrical field. These arrangements are merely exemplary of the orientations within the scope of the invention, and are not meant to limit the invention in any way.

The segmented electrodes 13 can be utilized in the control of the treated contaminated media temperature. If temperature of a treatment contaminated media becomes too high, water within the contaminated media will boil, and boiling water will reduce the efficacy of the remediating treatment. Thus, the temperature should be maintained below about 100° C. The contaminated media temperature is controlled by monitoring the contaminated media temperature and selectively adjusting applied voltage in response to the monitoring of the contaminated media temperature. The monitoring can be conducted by a temperature-sensing device 24 (FIG. 2), such as but not limited to, a thermometer, thermocouple, thermister, resistance thermal device, and combinations thereof. The temperature-sensing device 24 can be placed in the bottom of an electrode well, in, or at the perimeter of the contaminated media. Alternatively, the temperature-sensing device 24 can be emplaced in the contaminated media at the contaminated media surface level or within the contaminated media. The monitoring can be conducted by an array of temperature-sensing devices 24, for example temperature-sensing devices 24 that are placed in a grid arrangement, for example at the contaminated media surface and within the contaminated media.

An example of a treatment process, within the scope of the invention, will now be discussed. The example is not intended to limit the invention in any way.

Soil samples are taken from several contaminated media locations and a contamination level is determined to be about 500 ppm. Segmented electrodes 13, in the form of anodes, are emplaced in a line along one side of the contaminated media. The anodes are spaced in a range from about 0.1 m to about 1.0 m apart and are emplaced in the contaminated media in a range from about 2.0 m to about 20 m deep. On an opposing side of the contaminated media, a line of segmented cathodes of substantially similar spacing is emplaced at the same depth range. The line of cathodes is separated 10 m from the line of anodes.

Each anode and cathode consists of segmented electrodes 13 encased in a PVC perforated pipe with about an 8 cm ID. The segmented electrodes 13 are assembled before installation from alternating conductive segments 14 and insulating segments 15. Leads 17 are connected to each conductive element and are fed up through the pipe casing. The lead 17 ends are connected to a DC electrical supply that distributes power to each segment.

Additionally, a three-dimensional grid of voltage 13 and temperature-sensing devices 24 are emplaced in the contaminated region. The temperature-sensing devices 24 consist of about 3 mm diameter stainless steel sheathed thermocouples. The stainless steel sheathing serves as a voltage probe to measure electric potential in the soil and voltages are recorded by the datalogger. The temperature-sensing devices 24 are installed at depths of about 1, 2, 4, 6, 8, and 10 m in a square grid spacing of about 2 m between adjacent temperature-sensing devices 24. A high impedance datalogger with a temperature-sensing device cold junction reference is attached to the temperature-sensing devices 24 to record temperatures.

In operation, clean water is supplied to the anode casings and contaminated groundwater is removed from the cathode casings by means of level-controlling pumps. About a 500 V voltage is applied across the electrodes, in which at least one of the electrodes comprises a segmented electrode 13. Electroosmosis drives the TCE contaminated ground water to the cathodes. Data from the temperature-sensing devices 24 and the voltage probes are input into a computer program that models transient response of soil potential and electric field. The computer model output is fed into the DC electrical power supply controller to control power distribution to the segmented electrodes 13. The power distribution is controlled so as to enhance the remediation process by reducing current density in regions that are overheating. Also, the power distribution is controlled so as to enhance the remediation process by increasing current density in contaminated media that exhibits non-uniform properties that require modified treatment.

While various embodiments are described herein, it will be appreciated from the specification that various combinations of elements, variations or improvements therein may be made by those skilled in the art, and are within the scope of the invention.

What is claimed:

1. A method for treating a contaminated media, the method comprising:
   detecting a non-uniform contaminated media property selected from electrical conductivity or electroosmotic permeability; and
   selectively applying an electric field to the contaminated media by emplacing at least one segmented electrode proximate the contaminated media to effect the method in a selected area of the contaminated media wherein the at least one segmented electrode comprises a plurality of conductive segments, wherein each conductive segment is separated by an insulating segment and each conductive segment comprises an electrical contact coupled to an electric source that is capable of separately applying a respective electric current to each conductive segment.

2. The method of claim 1, wherein the method further comprises injecting a solution for treatment of the contaminants, the solution comprises a remediating salt into the contaminated media.

3. The method of claim 2, wherein the at least one segmented electrode comprises at least a pair of electrodes emplaced peripherally at the contaminated media, at least one electrode emplaced opposed across the contaminated media from the injected solution thereby causing the remediating salt to migrate into at least a portion of the contaminated media to treat the contaminated media.

4. The method of claim 3, wherein the remediating salt comprises a sulfide, the contaminated media comprises an iron(III) bearing composition, and the sulfide reacts with the iron(III) bearing composition to produce at least one of iron (II) remediating ions and a ferrous sulfide zone.

5. The method of claim 3, wherein the remediating salt comprises a sulfide, the contaminated media comprises an iron(III) bearing composition, and the sulfide reacts with the iron(III) bearing composition to produce iron (II) remediating ion, the method further comprising the steps of:

applying an electric current to cause the iron(II) remediating ion to migrate into a portion of the contaminated media comprising contaminants.

6. The method of claim 3, further comprising the step of:

injecting the solution containing a remediating salt at an injection well, the injection well being disposed at an electrode.

7. The method of claim 3, wherein the remediating salt is selected from sodium sulfide, sodium bisulfide, sodium sulfide nonahydrate ($Na_2S$ $9H_2O$), sodium sulfide ($Na_2S$), sodium hydrogen sulfide, hydrogen sulfide, or ferrous sulfide.

8. The method of claim 3, wherein the contaminated media comprises an aquifer.

9. The method of claim 3, wherein the contaminated media comprises a chlorinated hydrocarbon.

10. The method of claim 3, wherein the region contains iron(III) comprises minerals, the remediating salt comprises a sulfide, the method further comprises the step of:

applying the electric voltage to migrate the sulfide to migrate into the iron(III) to react contaminants and form iron(II), the iron(II) causes reductive dechlorination of the contaminants.

11. The method of claim 1, wherein the remediating salt comprises a sulfide, the contaminated media comprises an iron(III) bearing composition, and the sulfide reacts with the iron(III) bearing composition to produce a ferrous sulfide zone, the method further comprising the steps of:

applying an electric current to cause the contaminated aqueous composition to migrate ferrous sulfide zone for treatment.

12. The method of claim 11, further comprising the step of:

injecting a reducing agent at an electrode, wherein the reducing agent migrates to a vicinity of the ferrous sulfide zone for further treatment of the contaminated media.

13. The method of claim 12, wherein the reducing agent is selected from an organic acid, thiosulfate, metabisulfite, hypophosphite, or ammonium ion.

14. The method of claim 1, further comprising the step of:

sensing temperature in the contaminated media and selectively applying an electric field to change temperature in a selected contaminated media region.

15. A method for treating a contaminated media comprising a contaminated aqueous composition, the method comprising:

emplacing electrodes proximate contaminated media that comprises an iron(III)-containing zone peripherally disposed to the contaminated aqueous composition;

injecting a solution containing a remediating sulfide salt into contaminated media; and selectively applying an electric current between electrodes imposed across an iron(III)-containing zone peripheral to the contaminated aqueous composition to cause the remediating sulfide salt to selectively migrate into the iron(III)-containing zone, wherein the remediating sulfide salt reacts with iron(III) to produce a ferrous sulfide barrier zone that is generally peripheral to the contaminated aqueous composition.

16. The method of claim 15, wherein the remediating sulfide salt is selected from sodium sulfide, sodium bisulfide, sodium sulfide nonahydrate ($Na_2S$ $9H_2O$), sodium sulfide ($Na_2S$), sodium hydrogen sulfide, hydrogen sulfide, or ferrous sulfide.

17. The method of claim 15, wherein the contaminated aqueous composition comprises an aquifer.

18. The method of claim 15, wherein the contaminated aqueous composition comprises a chlorinated hydrocarbon.

19. The method of claim 15, wherein at least one of the electrodes comprises a segmented electrode, the segmented electrode comprising a plurality of conductive segments, wherein each conductive segment is separated by an insulating segment and each conductive segment comprises electrical contacts coupled to an electric source that is capable of separately applying a respective electric charge to each conductive segment.

* * * * *